March 20, 1956
A. W. JOHNSON
2,738,724
ACTUATING MECHANISM FOR FRUIT JUICERS OR THE LIKE
Filed Dec. 30, 1952
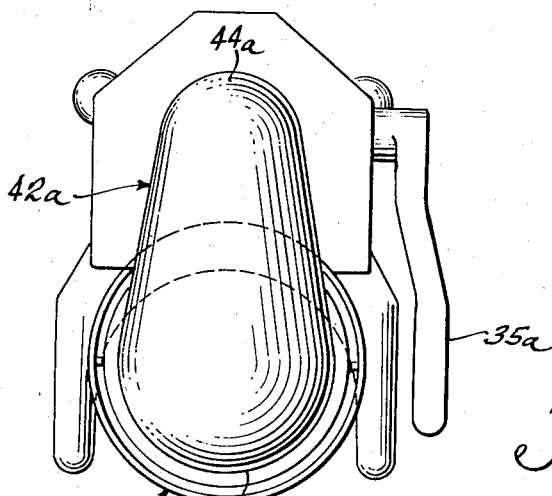
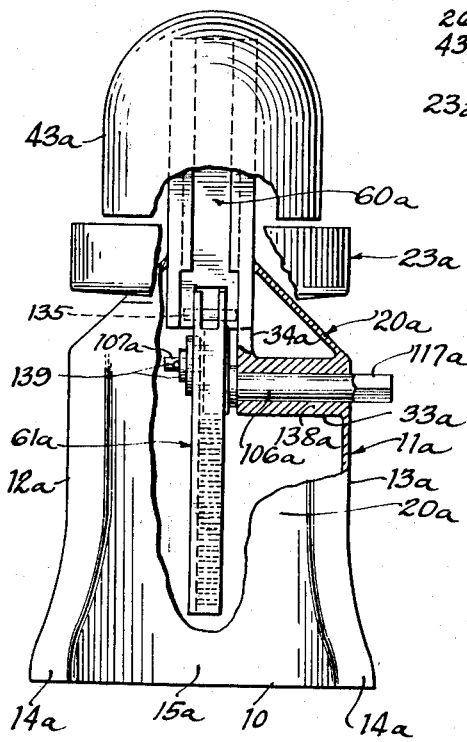
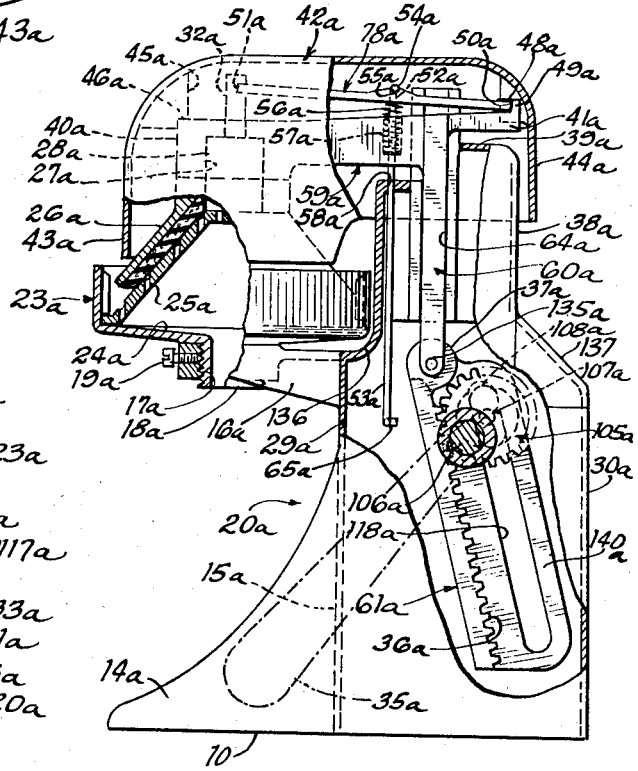
INVENTOR.
Alfred W. Johnson
BY
Robert H. Wendt
Attorney

United States Patent Office 2,738,724
Patented Mar. 20, 1956

2,738,724

ACTUATING MECHANISM FOR FRUIT JUICERS OR THE LIKE

Alfred W. Johnson, Chicago, Ill.

Application December 30, 1952, Serial No. 328,684

6 Claims. (Cl. 100—125)

The present invention relates to actuating mechanism for fruit juicers and the like; and the present application is a continuation of my prior application, Ser. No. 202,935, filed December 27, 1950, for Fruit Juicers, Patent No. 2,624,271, issued January 6, 1953.

In the fruit juicers of the prior art of the type employing a rack and pinion it is necessary for the operator to spend a certain amount of time in twirling the handle of the pinion shaft in order to bring the pressure cup down into engagement with the fruit, after which he places pressure upon it; and again the handle must be turned a number of times in such prior art devices to separate the pressure cup of the juicer from the rind.

One of the objects of the invention is the provision of an improved fruit juicer having an improved actuating mechanism by means of which the handle is adapted to effect a maximum amount of motion of the pressure cup to bring the cup into engagement with the fruit, and thereafter to exert a maximum amount of force with a minimum amount of movement by means of the same handle, with the handle in the most convenient position for exerting force upon it.

Another object of the invention is the provision of an improved fruit juicer mechanism of the class described, which is also provided with means for ejecting the rind from the pressure cup at or adjacent the upper limit of its stroke.

Another object of the invention is the provision of an improved construction and mechanism for fruit juicers or the like by means of which the juicer may be operated more swiftly and with a minimum number of movements on the part of the operator, while still exerting a maximum pressure to extract the juice from the fruit and to remove the previously squeezed rind from the pressure cup.

Another object is the provision of an improved fruit juicer construction which is simple, sturdy, capable of economical manufacture, efficient, and adapted to be used for a long period of time without necessity for repair or replacement of any of its parts.

Another object of the invention is the provision of an improved actuating mechanism for fruit juicers or for other applications, in which a maximum movement is desired for bringing the working parts into juxtaposition and a maximum force is desired for applying the working parts to each other.

Other objects and advantages of the invention will be apparent from the following description and the accompanying drawings, in which similar characters of reference indicate similar parts throughout the several views.

Referring to the single sheet of drawings accompanying this specification,

Fig. 1 is a top plan view of a fruit juicer embodying my invention;

Fig. 2 is a front elevational view partially broken away to show the mechanism;

Fig. 3 is a side elevational view partially broken away to show the mechanism.

Referring to Figs. 1–3, the present device preferably includes a supporting base 20a, having a stable bottom surface 10 for engaging the top of a table or other support. The base 20a has an upwardly extending hollow column 11a, which is formed with a front wall 29a and a rear wall 30a and a pair of side walls 12a and 13a.

The front wall 20a may be provided with a pair of forwardly extending arms 14a, defining a curved recess 15a for locating a tumbler or other container under the juicer.

The column 11a is provided with a forwardly extending supporting lug 16a, having a threaded bore 17a for receiving the externally threaded discharge spout 18a of a juicer cup. The threads permit the vertical adjustment of the position of the juicer cup, which is secured in the desired position by means of the set screw 19a.

The juicer cup 23a may comprise a substantially cylindrical metal member having the centrally located discharge spout 18a and a bottom 24a which slopes toward the discharge spout.

The juicer cup 23a supports an inner cone 25a provided with a multiplicity of apertures for passing the juice through the cone into the cup. The inner cone 25a cooperates with an outer movable cone 26a, which is imperforate except for a centrally located circular bore 27a for slidably supporting an ejector cylinder having an actuating stem 32a.

The right side wall 13a supports an inwardly extending bearing 138a, which is also joined to the rear wall by a web 33a, and to an upper column extension by a web 34a.

The bearing 138a has a cylindrical bore rotatably supporting an actuating shaft 106a having a noncircular end 117a for receiving the actuating lever or handle 35a.

The shaft 106a carries an integral pinion 105a, which meshes with a rack member 61a. The rack member 61a has the toothed portion or rack 36a located on its right side for engaging the pinion 105a and also carries a rearwardly extending flange 140a provided with a longitudinally extending slot 118a. The slot 118a acts as a guide for an oval slider 108a, which is slidably mounted in the slot 118a and has a bore for receiving an integral pin 107a centrally located on the opposite side of the pinion.

The side of the pinion 105a engages the flange 140a, while the pin 107a projects into the slot 118a and carries the oval slider 108a. While the pin 107a is centrally located with respect to the pinion, the integral shaft 106a is eccentrically located on the pinion.

The rack member 61a not only slides upward and downward, but has a pivotal motion caused by the fact that the shaft 106a is mounted in a fixed bearing and is eccentrically located on the pinion. The parts are shown in Fig. 3 at the limit of the downward motion of the handle, where maximum force is applied to the two working members comprising the juicer cones.

At its upper end the rack member 61a has a pivot flange 37a. This pivot flange is embraced by the bifurcated lower end of a slider 60a to which it is pivoted by a pin 135a passing through registering apertures.

The column 11a has a upward extension of smaller size 38a provided with guide surfaces for slidably supporting the slider 60a. The column extension 38a has a top wall 39a with a rectangular aperture for passing the slider 60a, which reciprocates in a vertical direction and is provided at its upper end with a forwardly extending arm 59a.

The arm 59a carries a head 40a, which supports the upper cone 26a, and which slidably supports the ejector cylinder 28a. The slider 60a also has a rearward extension 41a for carrying a cover 42a. The cover 42a comprises a hollow inverted trough with a forward cylindrical portion 43a, which is larger, to house the outer cone 26a.

The cover tapers toward the rear and has a smaller round rear portion 44a for housing the top of the column, over which it slides. The cover 42a has an inner angular lug 45a at the front with an angular recess 46a for seating the cover on the forwardly extending arm 59a.

The front end of the arm 59a or head 40a being round, the angular recess 46a is round in plan. The cover 42a also has a rear, inwardly extending angular lug having an angular recess 48a for receiving the rearward extension 41a of the slider 60a to support the cover at the rear.

The rearward extension 41a carries an upwardly turned end 49a engaging in the angular recess, leaving a socket 50a for receiving the end of an ejector lever 78a, which is pivotally mounted in this socket. The ejector lever 78a extends forwardly into a socket 51a in the ejector stem, where it is also pivotally mounted by a loose fit.

Between its ends the ejector lever 78a has an aperture 52a for passing an ejector rod 53a, which has a laterally turned end 54a, serving as a connecting rod trunnion and engaging in a round groove 55a in the lever 78a.

The ejector lever 78a is normally held in its uppermost position with its ejector withdrawn into the bore 27a by means of a spring 56a located in a cylindrical socket 57a in the forwardly extending arm 59a and engaging the ejector lever with its upper end. The ejector rod 53a passes downward through a hole 58a and is provided with a head 65a for engaging the lower side of the upper column wall 39a just before the upper limit of the movement of the slider 60a.

The final movement of the slider 60a upward causes a pull on the rod 53a, moving the ejector 28a downward to eject the rind from the upper or outer cone 26a.

The operation of my mechanism and fruit juicer is as follows: The handle lever 35a has a range of movement from a forward lower position, where its end is just above the table, this being the position of Fig. 3, to an upper backwardly extending position, amounting to about 180 degrees.

When the handle extends forwardly and horizontally or downwardly, the eccentric handle shaft 106a is located forwardly, as shown in Fig. 3, adjacent the rack. The handle acts on the rack at a radius which is equal to the distance from the center of the shaft to the pitch circle of the pinion, which is very short, to the eccentric location of the shaft on the pinion. Thus, when the handle extends forwardly and horizontally or downwardly, the handle acts with a tremendous leverage; and this is the position into which the two cones have been brought into engagement with the outside and the inside of a half of a citrus fruit; and tremendous pressure may be placed on the fruit to press out the juice.

When the handle is lifted from this forward position, the eccentric shaft 106a gradually turns the pinion around until the parts of the pinion which are at a greater radius from the handle axis are acting on the rack. As the handle progresses upward and backward, those parts of the pinion which are at a maximum radius are acting on the rack, so that the handle moves the rack very quickly after initial separation of the juicer cones.

Thus the juicer cones are adapted to have a maximum amount of movement when the handle is extending in an upward direction to open up the juicer more quickly and to separate the working parts more quickly. The working parts are also brought into working position from a wide open position very quickly; but thereafter the working parts or cones have a minimum amount of motion, but are the subject of a maximum amount of force, due to the increased leverage of the handle when the parts are in the position of Fig. 3.

As the pinion rotates counterclockwise in Fig. 3, the rack 61a moves upward, sliding the juicer head upward, and separating the cones. The rind is carried up by the outer cone because it has a lining of sponge rubber which tends to grip the rind. The rind is ejected at the upper limit of motion of the juicer head; and the parts are then separated widely so that the rind can be lifted out of the cup and a new piece of fruit inserted.

The present mechanism is not limited to use in fruit juicers, and may be used for actuating working parts, such as a drill press head, to bring the bit quickly into engagement with the work, and thereafter to permit application of a maximum amount of pressure with a minimum amount of effort.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a fruit juicer for citrus fruit, the combination of a metal base having a hollow column provided with side walls and front and rear walls, said column being provided at its upper end with a rectangular opening leading to downwardly extending box-like walls forming a guide, a complementary sliding member mounted in said guide and having a forwardly projecting cross-head, a downwardly open juicer cone carried by said cross-head at its forward end and having a frusto-conical interior, a forwardly projecting arm carried by said column, and having a vertical threaded bore which is co-axial with said cylindrical bore, a juicer cup comprising a substantially cylindrical member open at the top and having a central, downwardly extending, threaded conduit in said threaded bore for adjusting said cup in elevation, means for securing the cup in a predetermined rotative position, a male juicer cone mounted in said cup and having an upwardly extending frusto-concial surface complementary to the first-mentioned juicer cone, a lining of sponge rubber on the first-mentioned juicer cone, said lining gripping the rind of a citrus fruit to lift it from the second-mentioned cone, and an actuating mechanism carried by said column for moving said cross-head upward and downward in order to press a citrus fruit to remove the juice and to lift the rind from the male cone.

2. In a fruit juicer for citrus fruit, the combination of a metal base having a hollow column provided with side walls and front and rear walls, said column being provided at its upper end with a rectangular opening leading to downwardly extending box-like walls forming a guide, a complementary sliding member mounted in said guide and having a forwardly projecting cross-head, a downwardly open juicer cone carried by said cross-head at its forward end and having a frusto-conical interior leading to a cylindrical bore and to a smaller counterbore, a forwardly projecting arm carried by said column, and having a vertical threaded bore which is co-axial with said cylindrical bore, a juicer cup comprising a substantially cylindrical member open at the top and having a central, downwardly extending, threaded conduit in said threaded bore for adjusting said cup in elevation, means for securing the cup in a predetermined rotative position, a male juicer cone mounted in said cup and having an upwardly extending frusto-conical surface complementary to the first-mentioned juicer cone, a lining of sponge rubber on the first-mentioned juicer cone, said lining gripping the rind of a citrus fruit to lift it from the second-mentioned cone, and an actuating mechanism carried by said column for moving said cross-head upward and downward in order to press a citrus fruit to remove the juice and to lift the rind from the male cone, the said cylindrical bore containing a slidable plunger having an axial shank extending through said counterbore, and means for moving said slidable plunger downward at the end of the upward stroke of said cross-head for ejecting the rind from engagement with said sponge rubber lining.

3. In a fruit juicer for citrus fruit, the combination of a metal base having a hollow column provided with side walls and front and rear walls, said column being provided at its upper end with a rectangular opening leading to downwardly extending box-like walls forming a guide, a complementary sliding member mounted in said guide and having a forwardly projecting cross-head, a downwardly open juicer cone carried by said cross-head at its forward end and having a frusto-conical interior leading to a cylindrical bore and to a smaller counterbore, a forwardly projecting arm carried by said column, and having a vertical threaded bore which is co-axial with said cylindrical bore, a juicer cup comprising a substantially cylindrical member open at the top and having a central, downwardly extending, threaded conduit in said threaded bore for adjusting said cup in elevation, means for securing the cup in a predetermined rotative position, a male juicer cone mounted in said cup and having an upwardly extending frusto-conical surface complementary to the first-mentioned juicer cone, a lining of sponge rubber on the first-mentioned juicer cone, said lining gripping the rind of a citrus fruit to lift it from the second-mentioned cone, and an actuating mechanism carried by said column for moving said cross-head upward and downward in order to press a citrus fruit to remove the juice and to lift the rind from the male cone, the said cylindrical bore containing a slidable plunger having an axial shank extending through said counterbore, and means for moving said slidable plunger downward at the end of the upward stroke of said cross-head for ejecting the rind from engagement with said sponge rubber lining, the said latter means comprising a lever pivoted on said cross-head and pivotally connected with said shank, and a limit rod engaging the top of said lever and having its opposite end to said column, the limit rod drawing the plunger down to eject the rind as the cross-head moves upward.

4. In a fruit juicer for citrus fruit, the combination of a metal base having a hollow column provided with side walls and front and rear walls, said column being provided at its upper end with a rectangular opening leading to downwardly extending box-like walls forming a guide, a complementary sliding member mounted in said guide and having a forwardly projecting cross-head, a downwardly open juicer cone carried by said cross-head at its forward end and having a frusto-conical interior leading to a cylindrical bore and to a smaller counterbore, a forwardly projecting arm carried by said column, and having a vertical threaded bore which is co-axial with said cylindrical bore, a juicer cup comprising a substantially cylindrical member open at the top and having a central, downwardly extending, threaded conduit in said threaded bore for adjusting said cup in elevation, means for securing the cup in a predetermined rotative position, a male juicer cone mounted in said cup and having an upwardly extending frusto-conical surface complementary to the first-mentioned juicer cone, a lining of sponge rubber on the first-mentioned juicer cone, said lining gripping the rind of a citrus fruit to lift it from the second-mentioned cone, and an actuating mechanism carried by said column for moving said cross-head upward and downward in order to press a citrus fruit to remove the juice and to lift the rind from the male cone, the said cylindrical bore containing a slidable plunger having an axial shank extending through said counterbore, and means for moving said slidable plunger downward at the end of the upward stroke of said cross-head for ejecting the rind from engagement with said sponge rubber lining, the said latter means comprising a lever pivoted on said cross-head and pivotally connected with said shank, and a limit rod engaging the top of said lever and having its opposite end to said column, the limit rod drawing the plunger down to eject the rind as the cross-head moves upward, and spring means about said limit rod and seated in a bore in said cross-head, said spring engaging the lower side of said lever and urging the lever and plunger upward until the plunger is in said cylindrical bore.

5. In a fruit juicer for citrus fruit, the combination of a metal base having a hollow column provided with side walls and front and rear walls, said column being provided at its upper end with a rectangular opening leading to downwardly extending box-like walls forming a guide, a complementary sliding member mounted in said guide and having a forwardly projecting cross-head, a downwardly open juicer cone carried by said cross-head at its forward end and having a frusto-conical interior leading to a cylindrical bore and to a smaller counterbore, a forwardly projecting arm carried by said column, and having a vertical threaded bore which is co-axial with said cylindrical bore, a juicer cup comprising a substantially cylindrical member open at the top and having a central, downwardly extending, threaded conduit in said threaded bore for adjusting said cup in elevation, means for securing the cup in a predetermined rotative position, a male juicer cone mounted in said cup and having an upwardly extending frusto-conical surface complementary to the first-mentioned juicer cone, a lining of sponge rubber on the first-mentioned juicer cone, said lining gripping the rind of a citrus fruit to lift it from the second-mentioned cone, and an actuating mechanism carried by said column for moving said cross-head upward and downward in order to press a citrus fruit to remove the juice and to lift the rind from the male cone, said mechanism comprising a rack in said hollow column having its upper end pivotally connected to said sliding member, said rack having a downwardly extending part formed with teeth on the rear side, and having a flange extending at right angles to the teeth and having a through elongated slot, a shaft pivoted on said column and protruding from one side and provided with a handle which extends in a forwardly and downwardly disposed position at the end of its down stroke, said shaft carrying an eccentric pinion secured to the shaft on that side of the center which is toward the handle in the above-mentioned position, a slider slidably mounted in said elongated slot a concentric trunnion carried by the other side of said pinion and rotatably mounted in said slider.

6. In a fruit juicer for citrus fruit, the combination of a base having a hollow column provided with side walls and front and rear walls, said column being provided at its upper end with an opening leading to downwardly extending box-like walls forming a guide, a complementary sliding member mounted in said guide and having a forwardly projecting cross-head, a downwardly open juicer cone carried by said cross-head at its forward end and having a frusto-conical interior leading to a cylindrical bore and to a smaller counterbore, a forwardly projecting arm carried by said column, and having a vertical threaded bore which is co-axial with said cylindrical bore, a juicer cup comprising a substantially cylindrical member open at the top and having a central, downwardly extending, threaded conduit in said threaded bore for adjusting said cup in elevation, means for securing the cup in any predetermined rotative position, a male juicer cone mounted in said cup and having an upwardly extending frusto-conical surface complementary to the first-mentioned juicer cone, a lining of sponge rubber on the first-mentioned juicer cone, said lining gripping the rind of a citrus fruit to lift it from the second mentioned cone, and an actuating mechanism carried by said column for moving said cross-head upward and downward in order to press a citrus fruit to remove the juice and to lift the rind from the male cone, said mechanism comprising a rack in said hollow column having its upper end pivotally connected to said sliding member, said rack having a downwardly extending part formed with teeth on the rear side, and having a flange extending at right angles to the teeth and having a through elongated slot, a shaft pivoted on said column and protruding from one side and provided with a handle which extends in a forwardly and downwardly disposed position at the end of its down stroke, said shaft carrying an eccentric pinion secured to the shaft on that side of the center which is toward the handle in the above-mentioned position, a slider slidably mounted in said elongated slot a concentric trunnion carried by the other side of said pinion and rotatably mounted in said slider, the said handle applying maximum compressive force as it moves downward with the cones engaging a citrus fruit half to the end of its down stroke, and the said handle moving the upper cone with a maximum speed for other positions of said handle.

References Cited in the file of this patent

UNITED STATES PATENTS

| | | |
|---|---|---|
| 361,764 | Johnson | Apr. 26, 1887 |
| 393,128 | Stout | Nov. 20, 1888 |
| 410,473 | Whitman | Sept. 3, 1889 |
| 752,884 | Carmichael | Feb. 23, 1904 |
| 974,319 | Walker | Nov. 1, 1910 |
| 1,164,992 | Cookson | Dec. 21, 1915 |
| 2,151,500 | Cecil | Mar. 21, 1939 |
| 2,345,731 | Coyle | Apr. 4, 1944 |
| 2,474,399 | Johnson | June 28, 1949 |